March 20, 1945.  S. A. SNELL  2,371,716
METHOD OF MAKING CARTRIDGE CASES AND THE LIKE
Filed Sept. 25, 1941   3 Sheets-Sheet 3
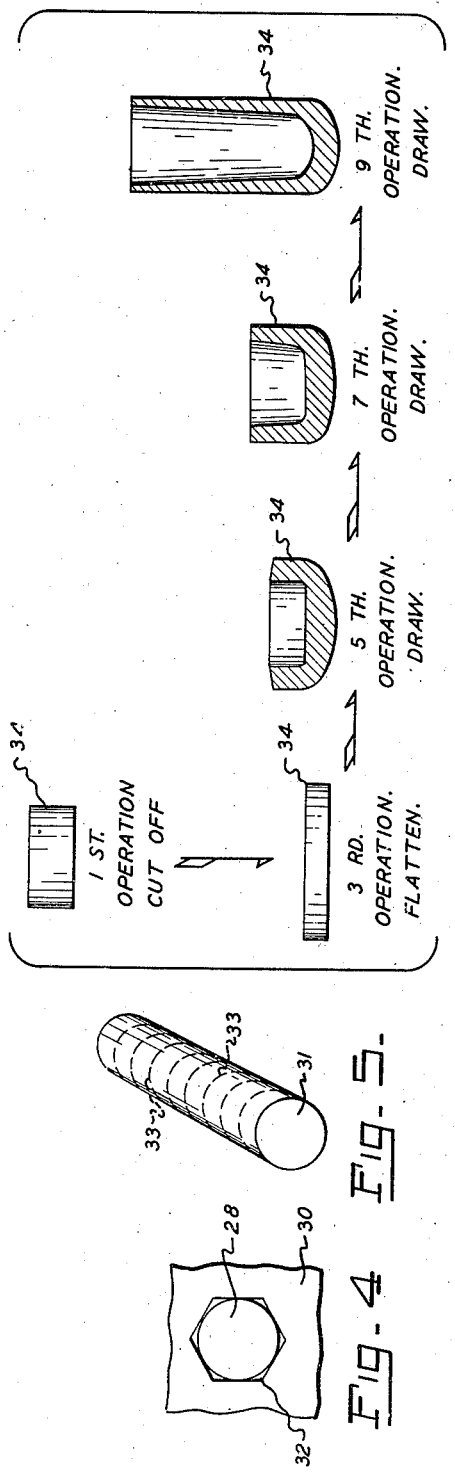
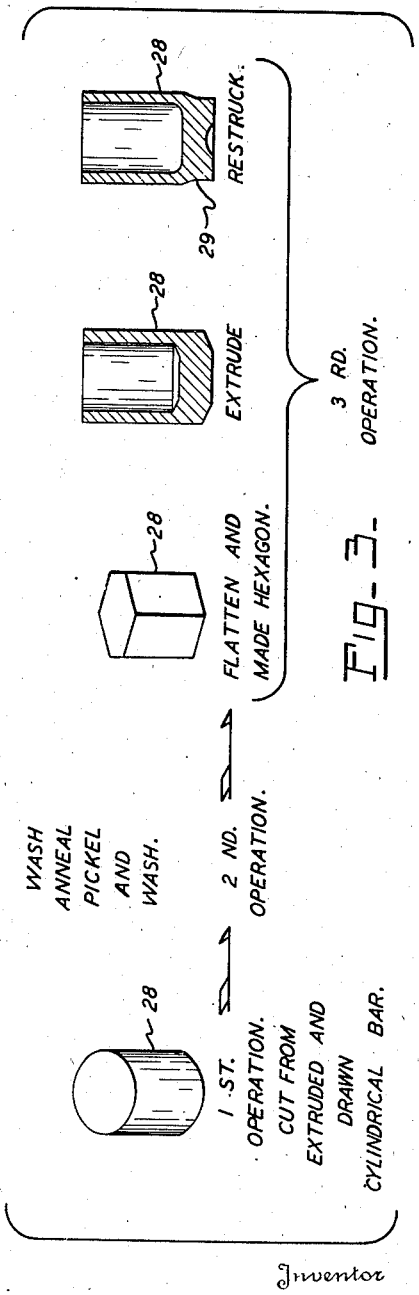
Inventor
SAMUEL A. SNELL
By Beaman + Langford
Attorneys Patented Mar. 20, 1945

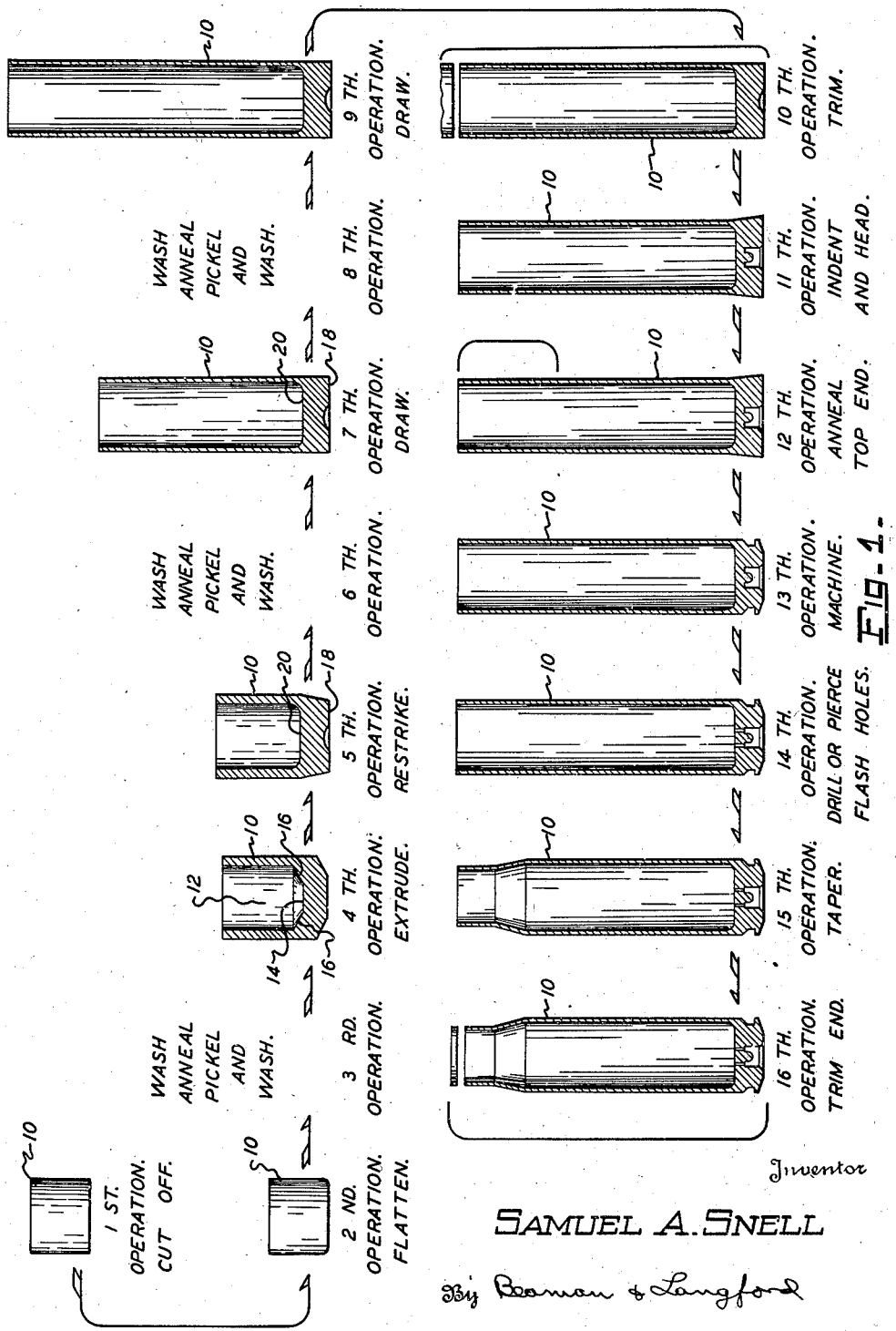

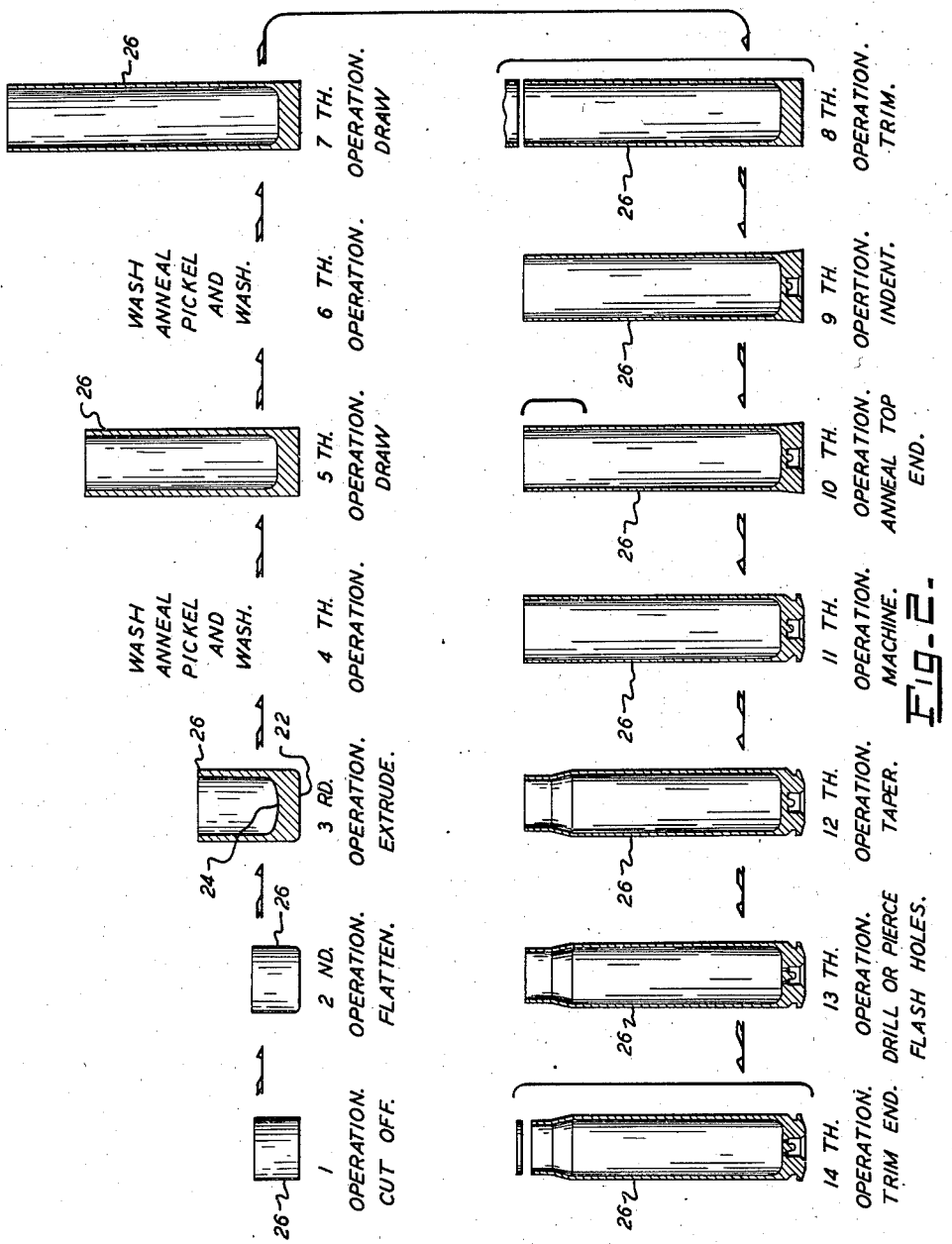

2,371,716

UNITED STATES PATENT OFFICE 2,371,716

METHOD OF MAKING CARTRIDGE CASES AND THE LIKE

Samuel A. Snell, Jackson, Mich., assignor, by mesne assignments, to Ryerson & Haynes, Inc., Jackson, Mich., a corporation of Michigan Application September 25, 1941, Serial No. 412,250

1 Claim. (Cl. 29—1.3)

The present invention relates to improvements in methods of fabricating elongated hollow metallic objects, being particularly concerned with the making of cartridge cases and the like.

Prior to the present invention it was the established practice in the making of cartridge cases and similar objects to fabricate the work blank from sheet stock, and thereafter by a succession of cupping, drawing and annealing operations to form the work blank into an elongated hollow case. It is hereby proposed to change this method of procedure in several respects. One proposal resides in cutting the work blank from bar stock. Another resides in subjecting the work blank to one or more extruding operations to partially form the hollow case, and then complete the elongation of the case by drawing. A further proposal resides in reshaping the work blank cut from the bar stock to obtain a form facilitating the extruding operation to follow. A still further proposal resides in cutting the work blank from bar stock and reshaping into a flattened disc to reduce scrap to a minimum. While certain of herein disclosed methods do not exclude therefrom the use of work blanks punched from sheet stock, or obtained in any other suitable manner, the cutting of the work blank from bar stock has the advantage of materially reducing the amount of scrap. Also, the step of extruding the work blank to cup shape in lieu of drawing the same into such shape has been found to materially reduce the annealing and drawing operations that would otherwise be required. Preferably the work blank is cut from extruded and/or drawn bar stock.

In the drawings the principles of the present invention have been diagrammatically illustrated by depicting to various degrees the steps involved in several proposed commercial methods involving the principles of the present invention. It will be, of course, understood that the steps set forth with respect to specific order and number are for the purpose of illustration and are not intended to restrict the principles of the invention thereto.

Fig. 1 is a schematic representation of the steps in one commercial form of the invention using cylindrical bar stock, Fig. 2 is a view similar to Fig. 1 of a modified form of the invention, Fig. 3 is a view similar to Fig. 2 of the first three operations of a still further modified form of the invention, in which the work piece has been shaped to facilitate extrusion, Fig. 4 is a fragmentary planned view of one form of die for shaping the work piece, Fig. 5 is a perspective view of a length of bar stock from which the work pieces are sheared, and Fig. 6 is a view similar to Fig. 1 of a still further modified form of the invention.

For convenience of disclosure, the principles of the invention are hereinafter described in connection with the manufacture of brass cartridge cases. The illustrated operations of the drawings have specific reference to cartridge cases for a 20 millimeter shell of brass, having approximately 70% copper and 30% zinc less impurities. While it is true that the present methods were specifically developed in connection with the manufacture of cartridge cases, it is not considered that the principles of the invention should be so limited, and it is the intention to include the application thereof to other materials and devices.

Referring to the series of operations diagrammatically set forth under Fig. 1, the work blank 10 has been preferably sheared or sawed from an extruded bar stock having a cross section corresponding to that of the work blank. In practice the bar stock and resulting blank 10 may be circular, polygonal, or any other cross section in which bar stock is conventionally produced. Circular bar stock has the advantage of providing a work blank which may require slightly less trimming following the final drawing operation than in the case of a work blank fabricated, for example, from hexagon bar stock. On the other hand, work blanks cut from polygonal bar stock have a tendency towards less resistance to flowing in the extruding dies.

As diagrammatically illustrated in Fig. 1, the first operation consists in the step of cutting or shearing the work blank from bar stock to produce the work blank 10. For the second operation the work blank 10 is flattened to provide a uniform shape. To facilitate shearing or cutting, the work blank should be harder than desirable for extruding and drawing operations, thus the third operation is one of annealing. The flat blank 10 is then put into a press and subjected to the fourth operation, which is an extruding operation performed in a male and female die. In the illustration of Fig. 1, the work blank 10 is shown in cross section following the various operations commencing with the fourth operation. As shown, the extruding dies of the fourth operation are so shaped as to provide a chamber 12 with an end wall 14 having an angular portion 16. In practice, shaping the male die to provide the angular portion has been found to facilitate the extrusion operation. The fifth operation is a restrike operation in a different set of dies, reshaping the faces 18 and 20 to approximately finished dimension and shape. It is also realized that during the extruding operation the entire work blank is under compression and there is not the tendency for the metal to tear as in the case of a drawing operation in which the metal flow is brought about by tensile stress.

The sixth to eighth operations, comprising washing, annealing, pickling, and the intermediate and following drawing operations, bring the case to the desired length prior to trimming. The tenth to sixteenth operations inclusive, as shown in Fig. 1, are conventional and form no part of the present invention. The nature of these operations is thought to clearly appear from the drawings.

If the operations of the method of Fig. 1 are compared with standard practice for making 20 millimeter cartridge cases, it will be found that the annealing operations have been reduced from six to four and the drawing operations have been reduced from five to three. Such reductions have been made possible through the use of bar stock and the extruding step disclosed.

In Fig. 2 is shown a further simplification of the method of Fig. 1. By comparing Figs. 1 and 2 it will be noted that the annealing steps between the flattening and extruding operations have been omitted. Also, the extruding dies for the third operation have been shaped to bring the surfaces 22 and 24 of the work blank 26 to approximately finished dimension and shape without the restrike operation of Fig. 1. The remaining operations of Fig. 2 correspond to those of Fig. 1. In practice it has been found that this reduction in operation may be taken and yet obtain satisfactory results. However, more force may be required to extrude the work blank of the method of Fig. 2.

For the reason that cylindrical bar stock is less expensive, for example, than hexagon bar stock, there is an advantage in substituting the operations of Fig. 3 for the first five operations of Fig. 1. This advantage is found in the fact that the hexagonal work blank may be more readily extruded by the dies than a cylindrical work blank, as there is less friction between the work blank and the female die. As shown in Fig. 3, a work blank 28 is shown after the first operation as cut from cylindrical bar stock (the work blank 28 being shown in perspective). Following the annealing at the second operation, the cylindrical work blank 28 is placed in a female die 30 of Fig. 4 having a cavity 32 of hexagonal shape and flattened and shaped to the hexagon form of the cavity 32. This is the first stage of the third operation of which there are three stages, the second and third stages corresponding to the fourth and fifth operations of Fig. 1. In other words, the cylindrical work blank 28 is flattened and made hexagon, extruded and restruck to shapen the same, in three different stages carried out on three different sets of dies. These stages have been grouped as the third operation for the reason that they are all carried out on the same machine by being indexed from one station to another.

As shown in Fig. 3, at the time the work piece 28 is restruck as part of the third operation, the lower end of the work piece 28 is preferably extruded to form the cylindrical portion 29. Preferably the diameter of the cylindrical portion 29 is only slightly larger than the finished diameter of the head of the cartridge case, with the result that the subsequent drawing operations do not result in any further working of the cylindrical portion 29, except for the final operation bringing the portion 29 down to finished size. This practice avoids working of the thick and heavy end portion of the work piece during each of the subsequent drawing operations.

Fig. 5 shows in perspective a bar 30 from which the work blanks 10, 26, and 28 are cut or sheared along the dotted lines 32. It should be appreciated that by shearing the work blank from a bar stock no scrap results.

In Fig. 6, one of the features of the present invention is shown adapted to the conventional practice of drawing the cartridge case from a relatively thin disc punched from sheet stock. In lieu of punching the work blank from sheet stock, the work blank 34 has been cut or sheared from bar stock as the first operation. Following annealing, the work blank 34 is then flattened into the disc of the third operation. The fifth operation is a cupping operation making the disc cup shape. Subsequent drawing operations, of which only the seventh and ninth have been illustrated, complete the elongation of the case. The intermediate annealing operations have not been illustrated in Fig. 6.

Having thus described my invention, what I desire to secure by Letters Patent and claim is:

As steps in the manufacture of cartridge cases and other thin wall parts, comprising forming a work blank from cylindrical bar stock, reshaping said work blank into generally polygonal shape, extruding said polygonal shaped work blank into an elongated generally cylindrical casing, and thereafter drawing said casing to desired wall thickness.

SAMUEL A. SNELL.